United States Patent [19]

Tortellier

[11] Patent Number: 4,476,959
[45] Date of Patent: Oct. 16, 1984

[54] PLATFORM LIFTING DEVICE MOUNTED ON A MOTOR VEHICLE

[75] Inventor: Christian Tortellier, Taverny, France

[73] Assignee: Manutis, France

[21] Appl. No.: 388,691

[22] Filed: Jun. 15, 1982

[30] Foreign Application Priority Data

Jun. 17, 1981 [FR] France ................ 81 11945

[51] Int. Cl.³ ............................................. B66B 9/20
[52] U.S. Cl. .................... 187/9 R; 414/921; 296/56
[58] Field of Search ............. 414/921, 917, 728, 557, 414/558; 296/55, 56, 57 R; 187/9 R, 9 E

[56] References Cited

U.S. PATENT DOCUMENTS

| | | | |
|---|---|---|---|
| 2,889,059 | 6/1959 | Selzer | 414/557 |
| 3,057,491 | 10/1962 | Schlensker | 414/557 |
| 3,172,551 | 3/1965 | Wolfe | 414/921 |
| 3,474,921 | 10/1969 | Rossoni | 414/557 |
| 3,883,014 | 5/1975 | Glomski et al. | 414/557 |
| 3,984,014 | 10/1976 | Pohl | 187/9 R |

FOREIGN PATENT DOCUMENTS 2052328 9/1971 France .

Primary Examiner—Joseph J. Rolla
Assistant Examiner—Kenneth Noland
Attorney, Agent, or Firm—Lerner, David, Littenberg, Krumholz & Mentlik

[57] ABSTRACT

Platform lifting device mounted on a motor vehicle, used especially for the transport of a physically handicapped person. The device comprises two connecting rods forming a parallelogram which rods are mounted for pivoting by one of their ends between the side-plates of a mounting plate integral with the floor of the vehicle, and by their other end, on the upper part of a bearing arm of which the lower end carries the pivoting axis of a lever on which is fixed an axis extending sideways and integral with the platform.

4 Claims, 5 Drawing Figures

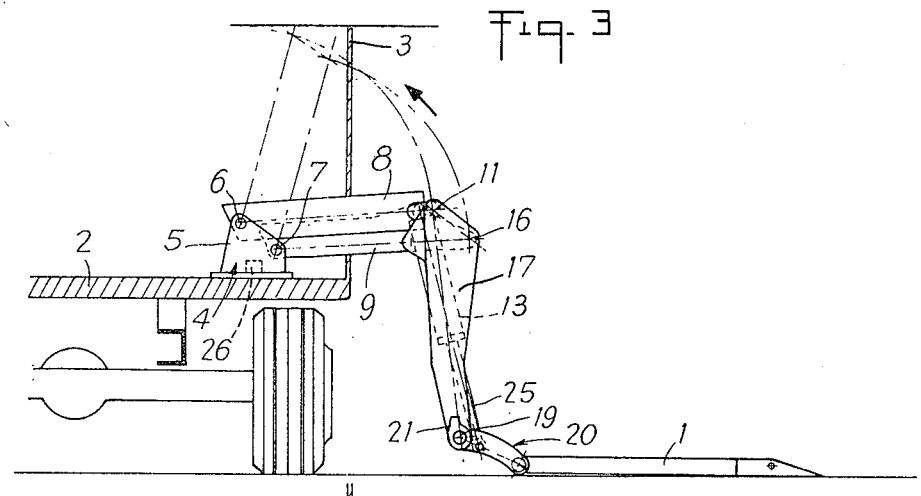
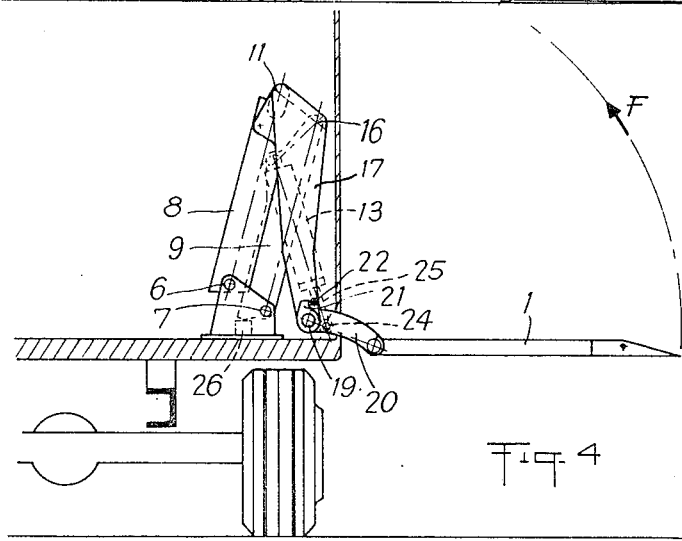
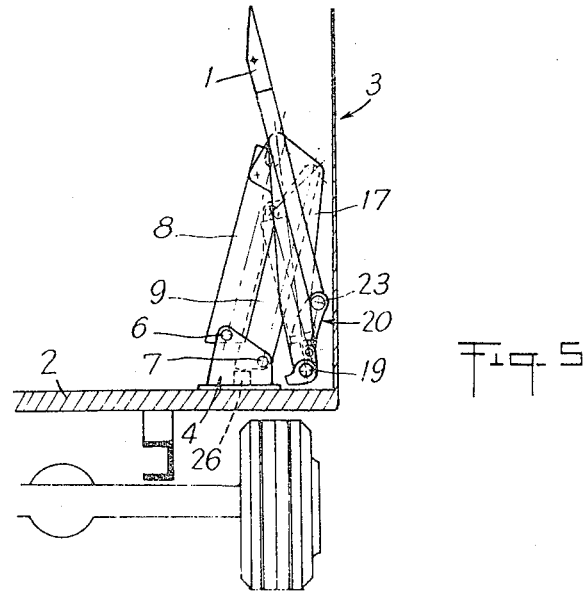

PLATFORM LIFTING DEVICE MOUNTED ON A MOTOR VEHICLE

The present invention relates to a platform lifting device mounted on a motor vehicle.

The transport of physically-handicapped persons, especially persons confined to a wheel chair, always raises difficulties when these persons have to be lifted in and out of vehicles, the floor of which is above ground level.

To overcome this drawback, it is known to use lifting platforms on which the wheel-chair and the person are positioned so as to be transferred from one level to another.

To this effect, the platform is joined to the floor of the vehicle by way of a lifting device. But these currently known devices are not entirely satisfactory.

It is the object of the invention to propose a platform lifting device comprising two connecting rods forming a parallelogram which rods are mounted for pivoting by one of their ends between the side-plates of a mounting plate integral with the floor of the vehicle, and by their other end, on the upper part of a bearing arm of which the lower end carries the pivoting axis of a lever on which is fixed an axis extending sideways and integral with the platform, said lever carrying in its middle part a pivot on which is mounted one of the ends of a jack, the other end of which is pivotally mounted on the lower linkage plate behind the pivot pin on which the bearing arm is pivotally mounted.

The device according to the invention is simple and inexpensive to produce, this permitting its production to suit requirements. The device only occupies a limited space inside the vehicle when retracted for transportation.

Moreover, its opening out and folding up are entirely mechanised with only one jack and without the manual operation of the handicapped person.

The invention will be more readily understood on reading the following description with reference to the accompanying drawings, in which:

FIG. 3 is a side elevation of the platform-lifting device when the platform rests on the ground;

FIG. 4 is a side elevational view of the lifting device when the platform is in the raised horizontal position;

FIG. 5 is a side elevational view of the lifting device in the retracted position.

Figure 1:
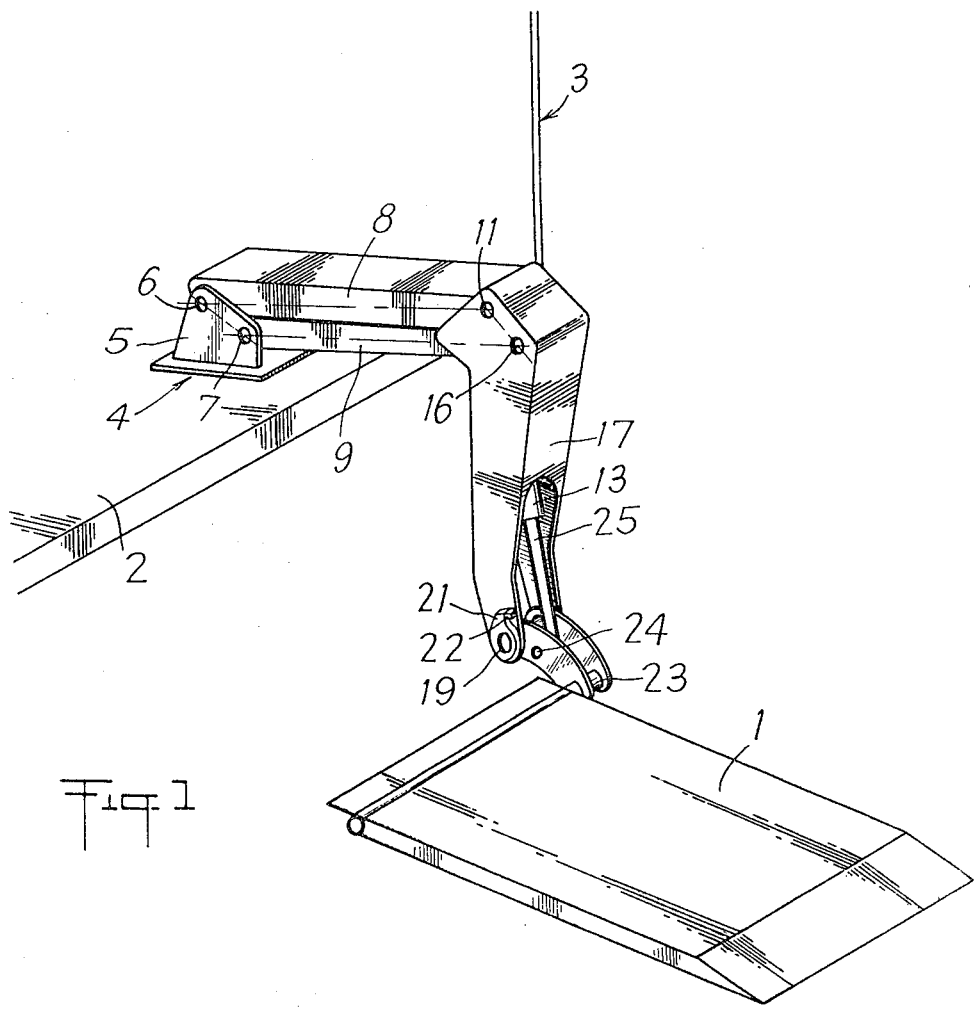
FIG. 1 is a perspective view of the platform lifting device according to the invention.
Figure 2:
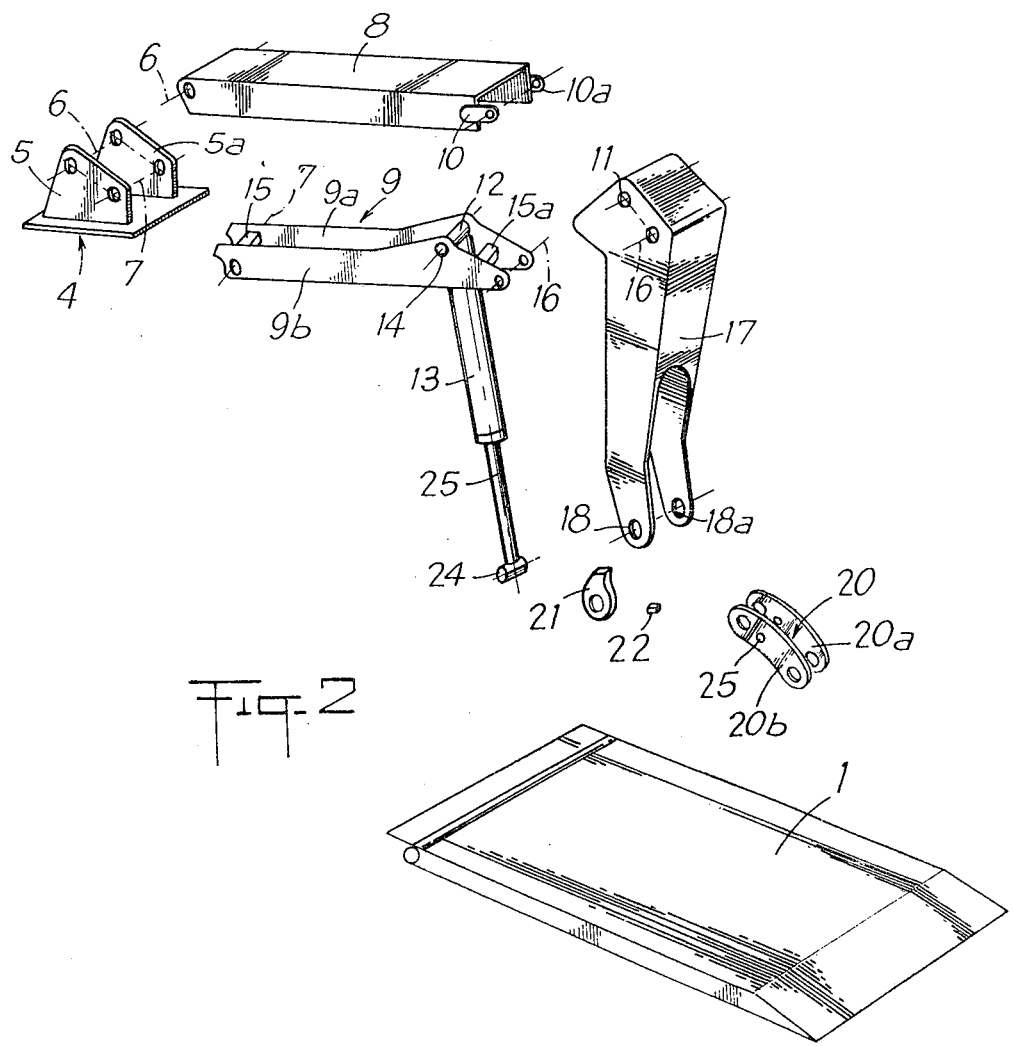
FIG. 2 is a synoptic view of said device.

FIGS. 1 to 3 show one embodiment of a device for lifting a platform 1, which device is mounted on the floor 2 of a motor-vehicle 3.

Said device comprises a mounting plate 4 secured to the floor 2 of the vehicle and having two side-plates 5, 5a between which upper 8 and lower 9 linkages are mounted by one of their ends for pivoting about pivots 6 and 7. The upper linkage having a U-shaped cross-section comprises at its end opposite the pivot 6, lugs 10, 10a through which is fitted a pivot 11 by which the linkage 8 is pivotally mounted on the upper part of a bearing arm 17. The lower linkage 9 is constituted of two plates 9a, 9b joined together by cross-pieces 15, 15a.

At the end of the lower linkage 9 opposite the pivot 7 is mounted a pivot 16 by which the said linkage is pivotally mounted on the bearing arm 17. Said arm 17 is provided at its lower part with holes 18, 18a in which a lever 20 is pivotally mounted about a pivot 19, said lever 20 being constituted by two plates 20a, 20b, the said pivot 19 being integral with a lug 21 adapted to abut against a member 22 secured on one of the faces of the arm 17.

At its end opposite the axis 19, the lever 20 is fast with a shaft 23 which extends laterally and on which is secured the platform extending horizontally.

Said lever 20 is provided in its middle part with holes 25 in which is pivotally mounted a gudgeon 24 provided at the end of the sliding rod 25 of a jack 13 whose body is integral with a gudeon 12 engaged in holes 14 provided in plates 9a, 9b of lower linkage 9.

Between the side-plates 5, 5a of the mounting plate 4 is provided a boss 26 against which one of the ends of the lower linkage 9 can abut when said linkage is in the retracted position (FIGS. 4 and 5).

The platform lifting device according to the invention works as follows:

Platform 1, resting on the ground as illustrated in FIG. 3, is loaded. To bring the load to the level of the vehicle floor 2, the jack 13 has to be fed in order to cause its retraction on the bearing arm 17 and the deformation of the parallelogram formed by linkages 8 and 9, as illustrated in FIG. 4.

Said linkages 8 and 9 are locked in this position due to the fact that linkage 9 is in abutment against the boss 26.

During the displacement of the assembly, platform 1 remains horizontal due to the fact that stud 21 is in abutment against the stud 22.

When the load has been transferred from platform 1 to the floor 2 of the vehicle, said platform can be retracted in. Indeed, linkages 8, 9 and arm 7 being locked inside the vehicle, if the jack goes on being retracted, this acts on the lever 20 which pivots as well as platform 1 around pivot 19 in the direction of arrow F, bringing said platform in the retracted position illustrated in FIG. 5.

To unload, the jack is actuated, causing the rod 25 to extend and platform 1 to spread out and to come into a high horizontal position, as illustrated in FIG. 4.

By continuing to extend the rod 25 of the jack, the lug 21 being in abutment against the stud 22, there occurs a deformation of the assembly formed by linkages 8 and 9 and arm 17 which brings the platform 1 on ground level (FIG. 3).

The invention is in no way limited to the description given hereinabove and on the contrary covers any modifications that can be brought thereto without departing from the scope thereof.

What is claimed is:

1. A platform lifting device mountable on the floor of a vehicle comprising a mounting plate for mounting on said floor of said vehicle, a first connecting arm including a first end and a second end, said first end of said first connecting arm being pivotably connected to said mounting plate, a second connecting arm including a first end and a second end, said first end of said second connecting arm being pivotably connected to said mounting plate, a bearing arm including a first end and a second end, said first end of said bearing arm being pivotably connected to said second ends of both said first and second connecting arms at spaced apart locations on said bearing arm, whereby said pivotable connections at said first and second ends of said first and second connecting arms form a parallelogram, a lever member including a first end and a second end, said first end of said lever member being pivotably connected to said second end of said bearing arm, a jack member having a first end and a second end relatively movable between retracted and extended positions, said first end of said jack member being pivotably mounted to said first connecting arm at a point intermediate of said first and second ends thereof, and said second end of said jack member being pivotably mounted to said lever member at a point intermediate of said first and second ends thereof, a platform fixedly connected to said second end of said lever member, whereby retraction of said jack member causes said bearing arm to pivot about said pivotable connections with said first and second connecting arms at said first end of said bearing arm, in turn causing said parallelogram to deform in a manner so as to pivot said first and second connecting arms about said pivotable connections of said first and second connecting arms with said mounting plate, thereby lifting said platform.

2. The platform lifting device of claim 1, wherein said first end of said jack member is pivotably mounted to said first connecting arm at a point proximate to said second end of said connecting arm.

3. The platform lifting device of claim 1, wherein said mounting plate includes a stop member adjacent to said first end of said first connecting arm so as to limit the pivotable motion of said first connecting arm.

4. The platform lifting device of claim 1, wherein said first end of said lever member includes a lug member pivotable therewith, and including a boss member affixed to said second end of said bearing arm, whereby said lug member is adapted to contact said boss member upon the pivoting of said lever member so as to limit the pivotable motion of said lever member.

* * * * *